(12) United States Patent
Ranmuthu et al.

(10) Patent No.: US 7,152,800 B2
(45) Date of Patent: Dec. 26, 2006

(54) PREAMPLIFIER SYSTEM HAVING PROGRAMMABLE RESISTANCE

(75) Inventors: Indumini Ranmuthu, Plano, TX (US); Yukihisa Hirotsugu, Tokyo (JP); Mark Wolfe, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 453 days.

(21) Appl. No.: 10/225,956

(22) Filed: Aug. 22, 2002

(65) Prior Publication Data
US 2004/0035941 A1 Feb. 26, 2004

(51) Int. Cl.
*G06K 19/06* (2006.01)

(52) U.S. Cl. .................. 235/492; 330/296; 330/285

(58) Field of Classification Search ........ 235/492–493, 235/449; 360/67–68, 46; 327/65, 563; 330/123, 330/127, 361, 285, 296, 283
See application file for complete search history.

(56) References Cited

U.S. PATENT DOCUMENTS

| 5,619,386 | A | * | 4/1997 | Voorman et al. | 360/67 |
|---|---|---|---|---|---|
| 5,682,028 | A | * | 10/1997 | Coleman | 235/462.26 |
| 5,859,739 | A | * | 1/1999 | Cunningham et al. | 360/67 |
| 6,150,876 | A | * | 11/2000 | Ngo | 327/563 |
| 6,185,143 | B1 | * | 2/2001 | Perner et al. | 365/210 |
| 6,271,977 | B1 | * | 8/2001 | Chung et al. | 360/46 |
| 6,384,998 | B1 | * | 5/2002 | Price et al. | 360/51 |
| 6,400,520 | B1 | * | 6/2002 | Stoutenburgh et al. | 360/63 |
| 6,566,950 | B1 | * | 5/2003 | Rokhsaz | 330/253 |
| 6,573,784 | B1 | * | 6/2003 | Gower et al. | 330/9 |
| 6,577,187 | B1 | * | 6/2003 | Lesko | 330/11 |
| 6,580,760 | B1 | * | 6/2003 | Larsen | 375/257 |
| 6,597,598 | B1 | * | 7/2003 | Tran et al. | 365/94 |
| 6,707,625 | B1 | * | 3/2004 | Leighton et al. | 360/46 |
| 6,714,069 | B1 | * | 3/2004 | Chevallier | 330/51 |
| 6,822,817 | B1 | * | 11/2004 | Chung et al. | 360/46 |
| 7,053,716 | B1 | * | 5/2006 | Taylor | 330/296 |
| 2002/0131193 | A1 | * | 9/2002 | Choi | 360/67 |
| 2002/0176198 | A1 | * | 11/2002 | Cyrusian et al. | 360/68 |
| 2004/0056723 | A1 | * | 3/2004 | Gotou | 330/295 |

* cited by examiner

*Primary Examiner*—Thien M. Le
*Assistant Examiner*—Edwyn Labaze
(74) *Attorney, Agent, or Firm*—W. James Brady; Frederick J. Telecky, Jr.

(57) ABSTRACT

A biasing scheme is disclosed that helps reduce current noise in an associated device, such as, for example, a magneto-resistive device. The biasing scheme provides for setting a resistance path in a preamplifier, which is operative to energize the associated device, based on a biasing current that is to be used with associated device. Alternatively or additionally, the resistance path can be set based on a resistance of the associated device. As a result of setting the resistance path in this manner, noise through the associated device can be mitigated during its energization.

30 Claims, 6 Drawing Sheets

PREAMPLIFIER SYSTEM HAVING PROGRAMMABLE RESISTANCE

TECHNICAL FIELD

The present invention relates to a preamplifier system for biasing an associated device. More particularly, the present invention relates to a preamplifier system having a programmable resistance.

BACKGROUND OF THE INVENTION

Certain hard disk drive systems use a magneto-resistive (MR) head for reading data on a disk. The MR head is biased with a bias voltage or a bias current. As the disk containing the data rotates adjacent to the MR head, magnetic flux from the disk varies the resistance through the MR head. The magnetic flux from the disk is a function of the data magnetically stored on the disk. The varying resistance through the MR head is indicative of the data on the disk.

A preamplifier system is used to provide the bias voltage or bias current to the MR head. A typical preamplifier system is configured to operate over a wide bias range. For example, in a current biased preamplifier system, the preamplifier system may be designed to operate with an MR head requiring a bias current in the range of 1 to 8 mA. In order to provide the desired bias range, biasing resistors in the preamplifier system are designed for the maximum bias current $I_{max}$ (e.g., 8 mA) in the preamplifier's bias range. This traditional approach often results in such undesirable current noise through the MR head during operation of the preamplifier.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a preamplifier system for biasing an associated device. The preamplifier system includes a first preamplifier component adapted to receive power from a power source and connectable to the associated device. A second preamplifier component of the preamplifier system is also adapted to receive power from the power source and is connectable to the associated device, such that a bias can exist between the first and second preamplifier components and across the associated device. At least one of the first and second preamplifier components includes a programmable resistance. The programmable resistance is set based on to a parameter of the associated device.

In accordance with another aspect, the present invention relates an integrated circuit comprising a preamplifier circuit for biasing an associated device. The preamplifier circuit includes a first preamplifier component and a second preamplifier component. First and second input terminals of the integrated circuit can be used to connect the preamplifier circuit to a power supply. Device terminals of the integrated circuit further connect the preamplifier circuit to the associated device. At least one of the first and second preamplifier components includes a programmable resistance. The programmable resistance is set based on a parameter of the associated device to set a desired bias for the associated device.

In accordance with yet another aspect, the present invention relates to a method for configuring a preamplifier system for biasing an associated device. The method includes programming a programmable resistance of one or more preamplifier components of the system to enable a desired bias at the associated device, such as when the associated device is connected between the preamplifier components and the first and second preamplifier components receive power from a power source.

BRIEF DESCRIPTION OF THE DRAWINGS

The foregoing and other features of the present invention will become apparent to those skilled in the art to which the present invention relates upon reading the following description with reference to the accompanying drawings.

DETAILED DESCRIPTION OF THE INVENTION

The present invention relates generally to a biasing scheme that helps reduce current noise when an associated device is biased, such as by a preamplifier. The biasing scheme provides for setting a selected resistance path in the preamplifier based on a biasing current that is to be used with the associated device.

Figure 1:
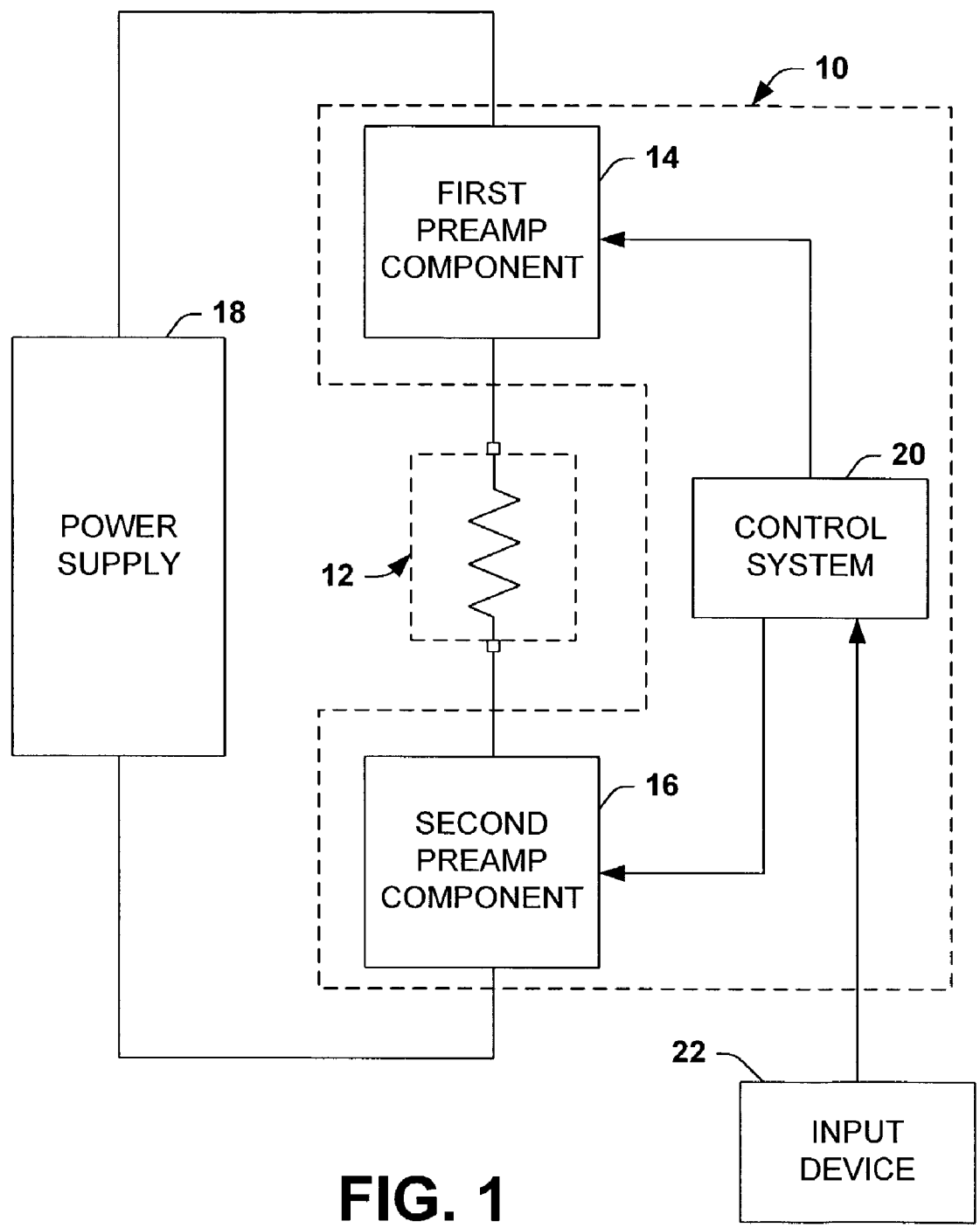
FIG. 1 is a schematic block diagram of a preamplifier system in accordance with an aspect of the present invention.

FIG. 1 is a schematic block diagram of a preamplifier system 10 in accordance with an aspect of the present invention. The preamplifier system 10 illustrated in FIG. 1 provides a bias for an associated device, such as an MR head 12. The preamplifier system 10 includes first and second programmable preamplifier components 14 and 16, respectively, each of which receives power from a power source (e.g., a voltage source that supplies a control voltage) 18. The preamplifier system 10 also includes a control system 20, which is connectable to an input device 22, such as a keyboard or other I/O device, for entering information to program the first and second programmable preamplifier components 14 and 16.

By way of example, the control system 20 can be utilized to program an electrical characteristic, such as impedance (e.g., resistance), associated with one or both of the preamplifier components 14 and 16. The resistance in the preamplifier components 14 and 16 can be set to help suppress current noise associated with operation of the preamplifier system 10 and the MR head 12. For example, the resistances for the respective components 14, 16 can be set to maximize their combined resistance to help minimize current noise through the MR head 12. For example, the resistances of components 14, 16 can be based on the current range and control voltage provided by the power source 18.

By way of further example, the maximum bias current can be divided into a discrete number of subranges, each subrange having its own maximum current. The components 14, 16 are designed to provide a corresponding resistance for each current subrange. The resistance for a given subrange is functionally related to a maximum control voltage for the preamplifier 10 and the maximum current for that subrange. Thus, the control system 20 can selectively configure each of the components 14, 16 to provide a desired resistance based on the bias current for the preamplifier. Additionally or alternatively, the control system 20 can set the resistance of components 14, 16 based on the resistance of the MR head 12 (e.g., provided by input device 22) to improve the accuracy of the bias current associated with each respective subrange.

Figure 2:
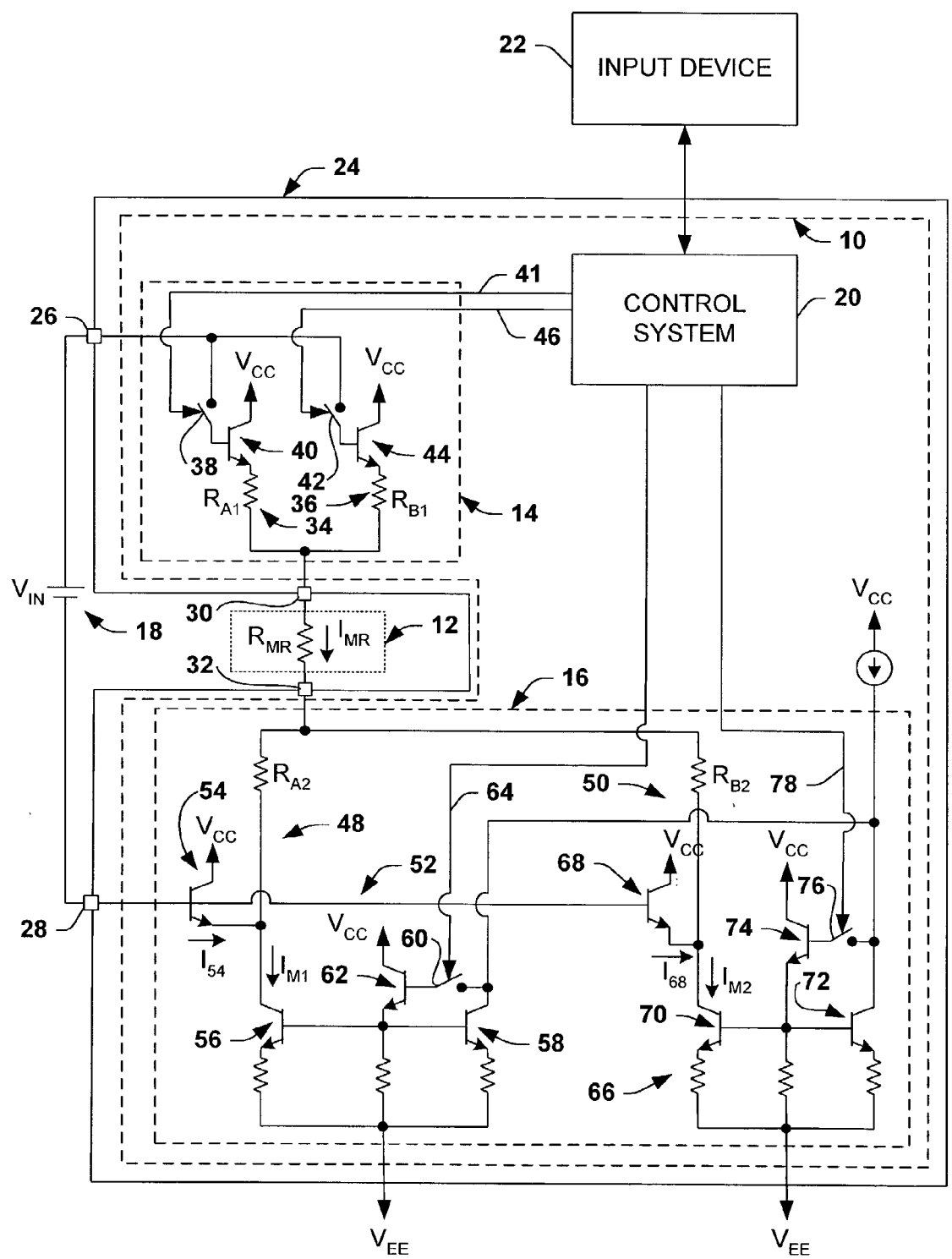
FIG. 2 is a circuit diagram of a preamplifier system in accordance with an aspect of the present invention.

FIG. 2 is an example of a circuit diagram that can be utilized to implement the preamplifier system 10 of FIG. 1. The preamplifier system 10 can be implemented in an integrated circuit 24. The integrated circuit 24 includes at least two input terminals 26 and 28. Input terminal 26 is operatively connected to the first programmable preamplifier component 14. Input terminal 28 is operatively connected to the second programmable preamplifier component 16. As shown in FIG. 2, the power supply 18 applies a voltage $V_{IN}$ across the input terminals 26 and 28. The voltage $V_{IN}$, for example, corresponds to a control voltage provided by a digital-to-analog converter (not shown) in response to an input signal indicative of a desired current to be provided to MR head 12.

The integrated circuit 24 also includes at least two device terminals 30 and 32. Device terminal 30 is adapted to electrically couple to a first terminal of the MR head 12. Device terminal 32 is adapted to electrically couple to a second terminal of the MR head 12. As will be discussed below, the preamplifier system 10 of FIG. 2 applies a bias across device terminals 30 and 32, such as for use in connection with a hard disk drive system (not shown).

By way of example, the first programmable preamplifier component 14 of FIG. 2 includes first and second parallel branches 34 and 36 that enable the first programmable preamplifier component 14 to be programmed with one of three different resistance values. Alternatively, the first programmable preamplifier component 14 may include more than two parallel branches. Additional parallel branches (or paths) will increase the number of programmable resistance values of the first programmable preamplifier component 14 that can be combined with the second programmable preamplifier component 16.

The first branch 34 includes a switch 38. A transistor or any other suitable structure may be used to form switch 38. A first end of switch 38 is operatively connected to input terminal 26. A second end of switch 38 is connected to the base of transistor 40 so as to control the emitter-follower amplifier provided by the transistor. Switch 38 is a normally open switch and is operatively connected to the control system 20 for receiving a control signal via control line 41. When switch 38 is open, the base of transistor 40 is not energized. When the control system 20 actuates switch 38 to a closed condition, the base of transistor 40 is energized so as to enable the emitter follower based on the voltage at 26. Thus, the switch 38 is connected to control the associated transistor 40 so as to set whether the resistor $R_{A1}$ is electrically connected to affect biasing the MR head 12, such as during operation of the circuit.

The collector of transistor 40 is connected to a supply voltage $V_{CC}$ and the emitter of transistor 40 is connected to a resistor $R_{A1}$. Resistor $R_{A1}$ is connected to an output of the first programmable preamplifier component 14, which corresponds to terminal 30.

The second branch 36 includes a switch 42, such as a transistor or any other suitable structure. A first end of switch 42 is operatively connected to input terminal 26. A second end of switch 42 is connected to the base of transistor 44, which also operates as an emitter-follower. For example, switch 42 is a normally open switch that is operatively connected to the control system 20 for receiving a control signal via control line 46. The control system 20 controls each of the switches 28 and 42 of the first preamplifier component 14, such as based on information (e.g., a desired bias current) provided by the input device 22. When switch 42 is open, the base of transistor 44 is not energized. When the control system 20 actuates switch 42 to a closed condition, the base of transistor 44 is energized to activate the emitter-follower amplifier. Accordingly, the switch 42 controls the associated transistor 40 to set whether resistor $R_{B1}$ is electrically connected to affect biasing the MR head 12, such as during operation of the circuit.

The collector of transistor 44 is connected to a control voltage $V_{CC}$ and the emitter of transistor 44 is connected to a resistor $R_{B1}$. Resistor $R_{B1}$ is connected to an output of the first programmable preamplifier component 14. The output of the first programmable preamplifier component 14 is operatively connected to device terminal 30.

The first programmable preamplifier component 14 of FIG. 2 is programmable to have one of three different resistance values. In particular, the first programmable preamplifier component 14 has a first resistance value of $R_{A1}$ when only switch 38 is closed. Resistance value $R_{A1}$ is the largest of the three programmable resistance values associated with the first preamplifier component. The first programmable preamplifier component 14 has second resistance value of $R_{B1}$ when only switch 42 is closed and a third resistance, value equal to $R_{A1}$ in parallel with $R_{B1}$, when both switches 38 and 42 are closed.

By way of example, the second programmable preamplifier component 16 of FIG. 2 includes first and second parallel branches 48 and 50, respectively, that enable the second programmable preamplifier component 16 to be programmed with one of three different resistance values. Alternatively, the second programmable preamplifier component 16 may include more than two parallel branches. Additional parallel branches will increase the number of programmable resistance values of the second programmable preamplifier component 16.

The first branch 48 of the second programmable preamplifier component 16 includes a resistor $R_{A2}$. The resistor $R_{A2}$ is connected to a first current mirror 52. A base of transistor 54 is connected to input terminal 28. A collector of transistor 54 is connected to a supply voltage $V_{CC}$. The emitter of transistor 54 is connected to the first current mirror 52 for providing current $I_{54}$ based on the signal at terminal 28.

The first current mirror 52 includes first and second bipolar transistors 56 and 58. The transistors 56 and 58 are substantially matched to one another. Resistor $R_{A2}$ and the emitter of transistor 54 are connected in parallel to the collector of transistor 56. The emitter of transistor 56 is connected to a low voltage $V_{EE}$ (e.g., a negative voltage) through a resistor. The base of transistor 56 is connected, through switch 60 and transistor 62, to a current source 64 that supplies a biasing current for current mirror 52.

A transistor or any other suitable structure may be used to form switch 60. Switch 60, which may be a normally open switch, is operatively connected to the control system 20 via control line 64. When switch 60 is open, the base of transistor 62 is not energized. When the control system 20 actuates switch 60 to a closed position, the base of transistor 62 is energized. The collector of transistor 62 is connected to a control voltage $V_{CC}$ and the emitter of transistor 62 is connected to the base of transistors 56 and 58 and to $V_{EE}$ through a resistor. Thus, closure of switch 60 provides a desired amplified signal at the bases of transistors 56 and 58 so as to activate current mirror 52. When the first current mirror 52 is enabled, the current $I_{M1}$ into the collector of transistor 56 equals (or is proportional to) the current into the collector of transistor 58. Also, when the current mirror 52 is enabled by activating the switch 60, the current $I_{M1}$ affects biasing of the MR head 12 by drawing current $I_{MR}$ through the resistor $R_{A2}$.

The second branch 50 of the second programmable preamplifier component 16 includes a resistor $R_{B2}$ connected to a second current mirror 66. The second branch 50 also includes a transistor 68 in an emitter-follower amplifier configuration. A base of transistor 68 is connected to input terminal 28. A collector of transistor 68 is connected to a supply voltage $V_{CC}$. The emitter of transistor 68 is connected, in parallel to resistor $R_{B2}$, to the second current mirror 66.

The second current mirror 66 includes first and second bipolar transistors 70 and 72 having their bases connected together. The transistors 70 and 72 can be matched to one another to facilitate operation of the current mirror. Resistor $R_{B2}$ and the emitter of transistor 68 are connected in parallel to the collector of transistor 70. The emitter of transistor 70 is connected to $V_{EE}$ through a resistor. The base of transistors 70 and 72 are connected together and to the current source 64 through switch (e.g., a transistor) 76 and transistor 74. The control system 20 also controls the switches 60 and 76 based on the information form the input device 22.

Switch 76 is a normally open switch and is operatively connected to the control system 20 via control line 78 for programming the switch state. When switch 76 is open, the base of transistor 74 is not energized so that no amplified output signal is provided to the base of transistors 70 and 72. The collector of transistor 74 is connected to a control voltage $V_{CC}$ and the emitter of transistor 74 is connected to the base of transistors 70 and 72. Thus, closure of switch 76 energizes the base of transistor 70 to activate the emitter-follower amplifier formed thereby and, in turn, energize the second current mirror 66. As a result, the current into the collector of transistor 70 equals (or is proportional to) the current into the collector of transistor 72. Thus, operation of the switch 76, which energizes transistor 74, affects biasing of the MR head 12 by operating transistor 70 to draw current $I_{MR}$ through the resistor $R_{B2}$ It will be appreciated that if both switches 60 and 76 are closed, current $I_{MR}$ will be divided accordingly through the respective branches 48 and 50 of the second preamplifier component 16 according to the resistances associated with each respective branch.

According to an aspect of the present invention, the preamplifier system 10 of FIG. 2 is designed to accommodate a range of bias for an MR head 12. For example, the preamplifier system 10 may be designed to provide a bias current range of between one and eight milliamps (1–8 mA). Thus, by programming the first and second preamplifier components 14 and 16 to have selected resistances as a function of the bias current, current noise can be substantially minimized. The control system is programmed and/or configured to selectively set the resistance values of at least one and typically each of the preamplifier components 14, 16 based on a value of a desired bias current for the preamplifier system, such as provided by the input device 22. Additional MR head bias current accuracies can be implemented by also setting the resistances based on the resistance of the MR head 12. Typically, however, the resistance of MR head 12 is relatively small as compared to the maximum control voltage divided by the maximum bias current in a given subrange.

Figure 3:
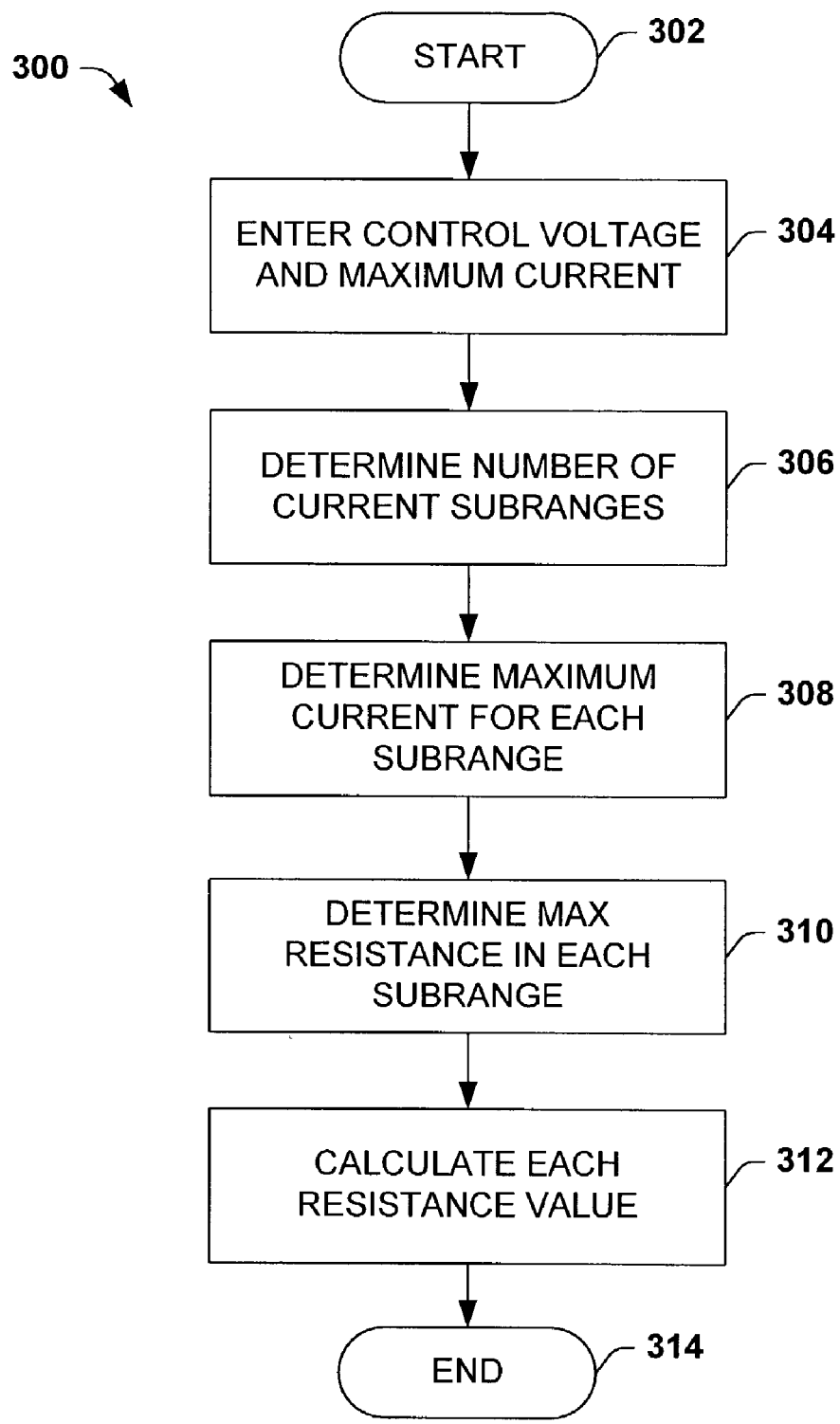
FIG. 3 is a flow diagram illustrating a process of determining the resistance for each resistor in accordance with an aspect of the present invention.

FIG. 3 is a flow diagram illustrating a process 300 that can be used to design a system that can provide different resistance values for a preamplifier system to mitigate current noise in accordance with an aspect of the present invention. For purposes of ease of explanation, FIG. 3 will be described with reference back to determining values for each resistor $R_{A1}$, $R_{B1}$, $R_{A2}$, and $R_{B2}$ of the preamplifier system 10 of FIG. 2. It will be appreciated that the process 300 could be used to design systems different from that shown in FIG. 2.

The methodology 300 can be implemented, in whole or in part, as computer-executable instructions running on a computer or other microprocessor-based machine, for example. While, for purposes of simplicity of explanation, the methodology is shown and described implementing serially, it is to be understood and appreciated that the present invention is not limited by the illustrated order, as some aspects can, in accordance with the present invention, occur in different orders and/or concurrently with other functions from that shown and described herein. Moreover, not all illustrated features may be required to implement a methodology in accordance with the present invention.

The process 300 begins at 302 in which general initializations occur. Such initializations include, for example, allocating memory, acquiring resources, instantiating objects and setting initial values for variables. At 304, the control voltage and a maximum bias current are entered into the control system 20, such as from an associated input device. By way of example, the maximum control voltage $V_{Control\_Max}$ is 5 volts and the bias current range is approximately 8 mA (e.g., 8 mA being the maximum bias current).

At 306, a number of current subranges is determined. This number can be fixed for a particular preamplifier system. Alternatively or additionally, the number of current subranges can set by a user or designer of the preamplifier system based, for example, on customer specifications. The current subranges can spread evenly across the total maximum current range or, alternatively, each subrange may be tailored to accommodate MR heads having a corresponding range of resistance. In the example of FIG. 2, there are three possible bias current ranges and, thus, for simplicity, the remaining process 300 is assumed to employ three different current subranges.

At 308, a maximum bias current is determined for each of the current subranges based on the subranges established at 306. As mentioned above, in the given example, the current range of 1–8 mA is divided to provide three subranges of bias current. By way of example, assume that the first subrange is 1–3 mA, the second subrange is 3.01–6 mA, and the third subrange is 6.01–8 mA. Accordingly, the maximum bias current for the first subrange is 3 mA, the maximum current for the second subrange is 6 mA and the maximum current for the third subrange is 8 mA (e.g., the maximum bias current for the preamplifier system).

At 310, a maximum resistance value in each current subrange is determined according to an aspect of the present invention. The maximum resistance $R_{MAX}$ for each current subrange is functionally related to the maximum control voltage $V_{Control\_Max}$ and the maximum bias current for each respective subrange. This computation can be performed algorithmically by employing suitable equations or by accessing a preprogrammed look-up table, such as:

$$R_{MAX\_i} = (R_{i1} + R_{i2}) = (V_{Control\_Max} / I_{max\_i}), \quad \text{Eq. 1}$$

where $R_{i1}$ and $R_{i2}$ are series resistors in a given resistor path that can be switched in to the preamplifier system to provide $R_{MAX}$ (typically $R_{i1} = R_{i2}$); and the subscript i denotes a given current subrange (e.g., i being a positive integer).

To improve accuracy of the resistance calculations at 310, for example, the maximum resistance can be determined for each current subrange as function of $V_{Control\_Max}$, $I_{bias\_max}$ for the respective subrange and $R_{MR}$ of the head 12. The values of $R_{MR}$ are known values that are typically provided by the MR head 12 manufacturer, and a maximum $R_{MR}$ (or range of suitable $R_{MR}$) is typically associated with each current subrange. For example, the following Eq. 2 provides an alternative equation that can be used to calculate a maximum resistance for a given current range:

$$R_{MAX\_i} = (R_{i1} + R_{i2}) = (V_{Control\_Max} / I_{max\_i}) - R_{MR}. \quad \text{Eq. 2}$$

Appropriate individual resistors for each of current subranges (e.g., first, second and third resistance values) are calculated. Assume that the first subrange maximum MR head resistance $R_{MR}$ is about 366 ohms, the second subrange maximum MR head resistance $R_{MR2}$ is about 283 ohms, and the third subrange maximum MR head resistance $R_{MR3}$ is about 240 ohms. For the example of FIG. 2, the first resistance value (e.g., $R_{A1} + R_{A2}$) is calculated using the highest bias current value of the first subrange $I_{max1}$ (e.g., 3 mA), the maximum control voltage $V_{Control\_Max}$ (e.g., 5 volts) and, if desired, the first subrange maximum MR head resistance $R_{MR1}$ (e.g., 366 ohms). Thus, given the assumed values, the first resistance value ($R_{A1} + R_{A2}$) is about 1300 ohms. The second and third resistance values are calculated in a similar manner. Therefore, given the assumed values, the second resistance value ($R_{B1} + R_{B2}$) is about 550 ohms and the third resistance value ($R_{A1} \| R_{B1} + R_{A2} \| R_{B2}$) is about 385 ohms.

At 312, the individual resistance of each resistor $R_{A1}$, $R_{A2}$, $R_{B1}$, and $R_{B2}$ is determined based on their respective resistances determined at 310. The resistor values define corresponding resistance paths that can be utilized in a preamplifier according to an aspect of the present invention. A look-up table may be used for determining the values of the individual resistors $R_{A1}$, $R_{A2}$, $R_{B1}$, and $R_{B2}$ that will be used, although such values can also be computed. The process 300 then ends at 314.

Figure 4:
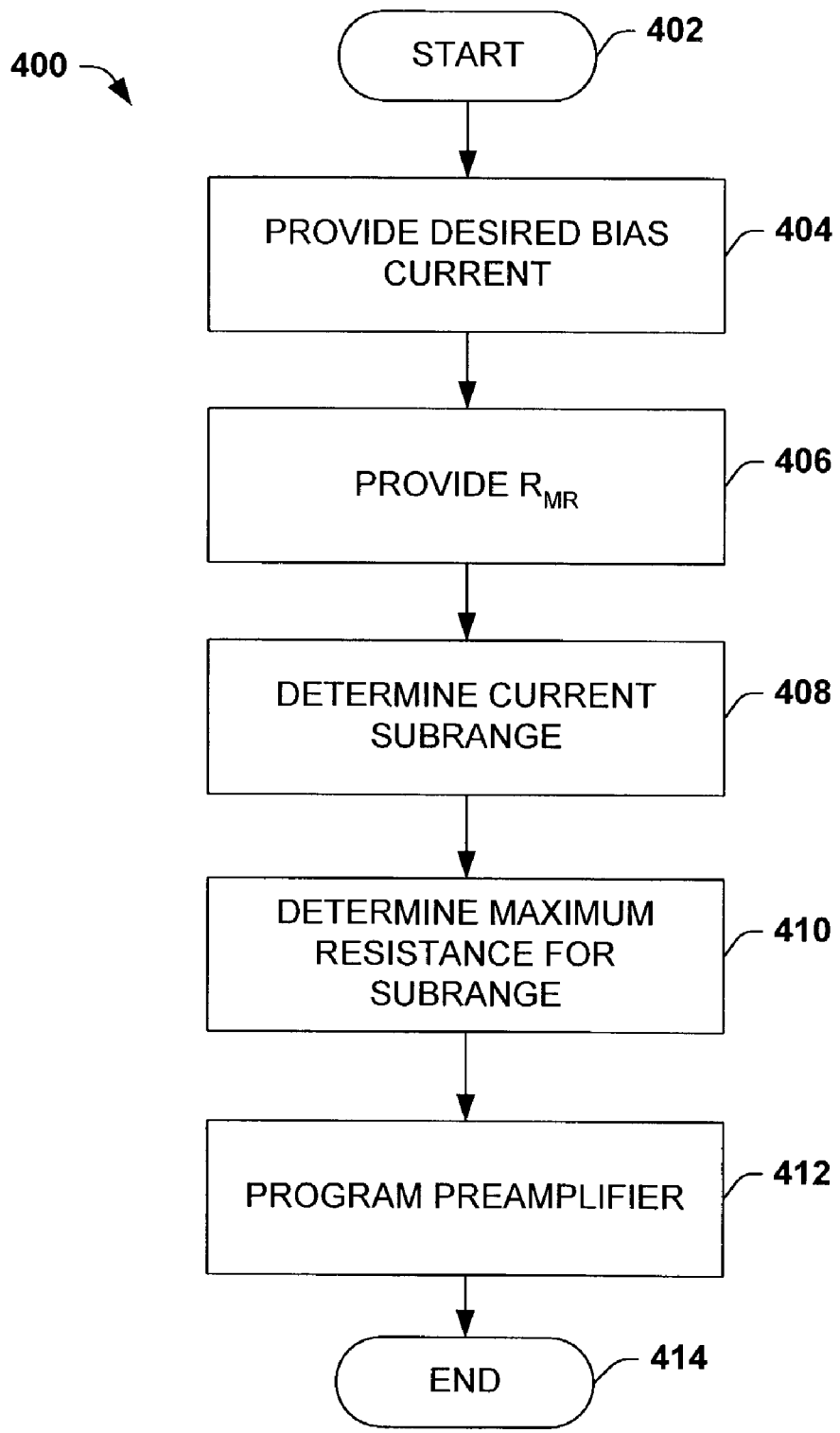
FIG. 4 is a flow diagram illustrating the process of programming a preamplifier system in accordance with an aspect of the present invention.

FIG. 4 is a flow diagram illustrating a process 400 of programming the preamplifier system 10 in accordance with an aspect of the present invention. For purposes of simplicity of explanation, the process 400 is described with reference to FIG. 2, although it will be understood and appreciated that the process is equally applicable to other systems and circuits implemented in accordance with an aspect of the present invention.

The process 400 begins at 402, such as in conjunction with powering up a preamplifier system. For example, at power up, memories can be reset, flags set to initial conditions, etc. At 404, a desired bias current is defined. For example, a designer or manufacturer can enter the bias current using an input device, such as device 22 of FIG. 2. Optionally, at 406, a known value of $R_{MR}$ can also be provided. As noted above, $R_{MR}$ typically is selected according to the $I_{MR}$ or, alternatively, $I_{MR}$ can be for a given $R_{MR}$. For example, assume that it is desirable to operate the MR head 12 with a 4 mA bias current.

At 408, a corresponding current subrange is determined based on the bias current provided at 404. The subrange also can be determined based on both the bias current and the $R_{MR}$ value. For example, the subrange can be determined by comparing the current provided at 404 with the possible current subranges to ascertain which subrange includes the desired bias current $I_{MR}$. In the example, the second subrange includes bias currents of 3.01–6 mA. Therefore, in the example, it is determined that the determined bias current $I_{MR}$ falls within the second subrange.

At 410, a maximum resistance is determined according to the subrange determined at 408. This determination can be made by look-up table or be computed, such as according to Eq. 1 or Eq. 2 noted herein. At 412, the preamplifier system is programmed to provide the determined resistance value associated with the current subrange. Thus, continuing with the above example relative to FIG. 2, the preamplifier system 10 is programmed to provide the second resistance value ($R_{B1} + R_{B2}$). To program the preamplifier system 10 to provide the second resistance value ($R_{B1} + R_{B2}$), the control system 20 closes switches 42 and 76. Similarly, when the determined bias current $I_{MR}$ falls into the first subrange, the control system 20 closes switches 38 and 60 to provide the first resistance ($R_{A1} + R_{A2}$). When the determined bias current $I_{MR}$ falls into the third subrange, the control system 20 closes switches 38, 60, 42, and 76 to provide the third resistance ($R_{A1} \| R_{B1} + R_{A2} \| R_{B2}$). The process 400 ends at 412. As a result of the process 400, the programmed preamplifier is able to operate efficiently with reduced current noise, such as when biased by current within the current range determined at 408.

Operation of the preamplifier system 10 of FIG. 2 is described below. During operation of the preamplifier system 10, the control voltage $V_{IN}$ from the power supply 18 is applied across input terminals 26 and 28 of the integrated circuit 24. Additionally, the MR head 12 is attached across device terminals 30 and 32.

When the preamplifier system 10 is programmed to provide the first resistance ($R_{A1} + R_{A2}$), control system 20 closes switches 38 and 60. As a result of closing switch 38, voltage $V_{IN}$ is applied to the base of transistor 40 and to the base of transistor 54. As a result, a voltage potential equal to about $V_{IN}$ is applied across the first branches 34 and 48 of the both the first and second preamplifier components 14 and 16 so that the desired bias current $I_{MR}$ exists across the MR head 12.

Closure of switch 60, energizes the first current mirror 52. The first current mirror 52 provides current $I_{M1}$ that is equal to the desired bias current $I_{MR}$ plus the current through transistor 54, designated 154. Thus, when operating the preamplifier system 10 in the first subrange, e.g., the low amperage subrange, the values of resistors $R_{A1}$ and $R_{A2}$ are maximized for that subrange. As a result, current noise suppression for the first subrange is optimized according to an aspect of the present invention.

When the preamplifier system 10 is programmed to provide the second resistance ($R_{B1} + R_{B2}$), control system 20 closes switches 42 and 76 to provide a different resistance path that includes $R_{B1}$ and $R_{B2}$. As a result of closing switch 42, voltage $V_{IN}$ is applied to the base of transistor 44 and to the base of transistor 68. This causes a voltage potential equal to about $V_{IN}$ to be applied across the second branches 36 and 50 of both the first and second preamplifier components 14 and 16 so that the desired bias current $I_{MR}$ exists across the MR head 12.

Closure of switch 76 energizes the second current mirror 66. The second current mirror 66 provides current $I_{M2}$ that is equal to the desired bias current $I_{MR}$ plus the current through transistor 68, designated $I_{68}$. Thus, when operating the preamplifier system 10 in the second subrange, e.g., the medium amperage subrange, the resistance path that includes $R_{B1}$ and $R_{B2}$ is generally maximized for that subrange, which operates to mitigate current noise accordingly.

In this example, the first resistance $(R_{A1}+R_{A2})$ is greater than the second resistance $(R_{B1}+R_{B2})$ and thus, suppresses more current noise than the second resistance. However, given a predetermined max control voltage $V_{IN}$, the preamplifier system 10 will not provide the desired MR head bias current $I_{MR}$ for the second subrange when operating at the first resistance value $(R_{A1}+R_{A2})$. Thus, when providing a bias current $I_{MR}$ in the second subrange, the second resistance $(R_{B1}+R_{B2})$ provides a generally optimized current noise suppression.

When the preamplifier system 10 is operated to provide the third resistance $(R_{A1}\|R_{B1}+R_{A2}\|R_{B2})$, control system 20 closes switches 38, 42, 60, and 76. As a result of closing switches 38 and 42, voltage $V_{IN}$ is applied to the base of transistors 40 and 44 and to the base of transistors 54 and 68. As a result, a voltage potential equal to about $V_{IN}$ is applied across both the first and second branches 34, 36 and 48, 50 of the first and second preamplifier components 14 and 16, respectively, so that the desired bias current $I_{MR}$ exists across the MR head 12.

Closure of switches 60 and 76, energizes the first and second current mirrors 52 and 66. The first current mirror 52 provides current $I_{M1}$ that is equal to a portion of the desired bias current $I_{MR}$ plus the current through transistor 54, designated $I_{54}$. The second current mirror 66 provides current $I_{M2}$ that is equal to the remaining portion of the desired bias current $I_{MR}$ plus the current through transistor 68, designated $I_{68}$. $I_{M1}$ and $I_{M2}$ are substantially equal or proportional to the current provided by current source 64. Thus, when operating the preamplifier system 10 in the third current subrange, e.g., the high amperage subrange, the resistance $(R_{A1}\|R_{B1}+R_{A2}\|R_{B2})$ provided by biasing resistors $R_{A1}$, $R_{A2}$, $R_{B1}$, and $R_{B2}$, which are connected to provide the resistance path, is maximized for that subrange so as to mitigate current noise. As mentioned above, it will be appreciated that any number of subranges could be implemented in accordance with an aspect of the present invention.

Figure 5:
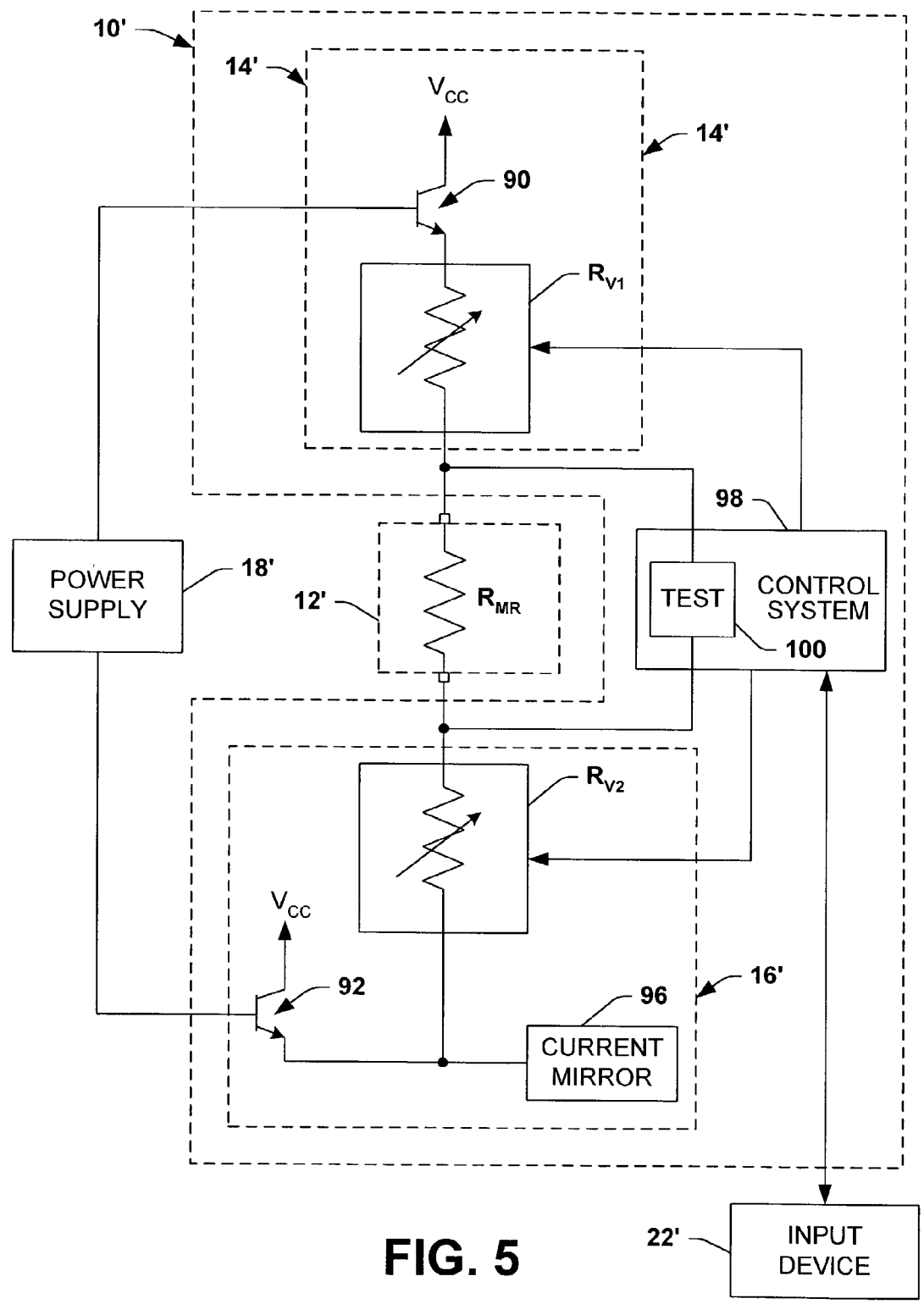
FIG. 5 is a schematic block diagram of a preamplifier system in accordance with another aspect of the present invention.

FIG. 5 is a schematic block diagram of a preamplifier system 10' in accordance with a second aspect of the present invention. Structures of FIG. 5 that can be the same or similar to structures identified in FIG. 1 are identified with the same reference numbers followed by a prime symbol.

The preamplifier system 10' of FIG. 5 includes first and second preamplifier components 14' and 16'. The first preamplifier component 14' includes transistor 90 and variable resistor component $R_{v1}$. The base of transistor 90 is electrically connected to a power supply 18'. The collector of transistor 90 is connected to a voltage indicated at $V_{CC}$ and the emitter of transistor 90 is connected to variable resistor $R_{v1}$.

The second preamplifier component 16' includes transistor 92 and variable resistor component $R_{v2}$. The base of transistor 92 is electrically connected to the power source 18'. The collector of transistor 92 is connected to voltage $V_{CC}$ and the emitter of transistor 92 is connected, in parallel with the variable resistor $R_{v2}$ to a current mirror 96. The current mirror 96 can be substantially similar to the first current mirror 52 of FIG. 2, for example. The MR head 12' is electrically connected to variable resistor $R_{v2}$. The MR head 12', which has a resistance indicated at $R_{MR}$, is electrically connected in series between variable resistor components $R_{v1}$ and $R_{v2}$. Transistor 92 is connected to source current into the juncture between variable resistor $R_{v2}$ and current mirror 96.

The control system 98 includes a test portion 100, which can be programmed and/or configured to measure resistance of $R_{MR}$. The test portion 100 of the control system 98 is electrically connected to across the MR head 12'. The test portion 100 of the control system 98 is used to determine the resistance $R_{MR}$ of the MR head 12'. For example, the test portion 100 includes a test current source (not shown) operative to apply a test current across the MR head 12. The determination of when to apply the test current can be performed automatically, such as at power up, at predetermined intervals, or in response to an activation signal, which can be a signal internal to the IC or an external signal (e.g., from input device 22'). The test portion 100 determines approximately the resistance $R_{MR}$ of the MR head 12' based on measured voltage and the test current applied thereby.

The control system 98 thus can determine an appropriate bias current range based on the particular MR head 12' being used. The determination of current range can be made via look-up table or by performing computations for a suitable current range for the MR head 12'. The look-up table, for example, can be hardwired into the control system or programmed by a customer (e.g., by the input device). The control system further is programmed to set an appropriate resistance path based on the current subrange. Because the current subrange is set based on $R_{MR}$, the system 10' can cater to a wider range of head resistance, such as described hereinabove.

Additionally or alternatively, the control system 98 can receive an input signal from an input device 22', such as a keyboard, computer, or other equipment configured to interface with the preamplifier system 10'. The desired bias current $I_{MR}$ of the MR head 12' is input into the control system 98 via the input device 22'. Additionally, the value of the control voltage is input into the control system 98 via the input device 22', although the control system 20 could detect the control voltage. The control system 98, in response to the input desired bias current $I_{MR}$ and control voltage and the determined MR head resistance $R_{MR}$, calculates values for variable resistors $R_{v1}$ and $R_{v2}$ and adjusts the respective values of the variable resistors based on the calculated values. It will be understood and appreciated that the control system further can adjust the resistance values for $R_{v1}$ and $R_{v2}$ during operation of the preamplifier system to further improve system performance and mitigate current noise.

In view of the foregoing, it will be appreciated that the preamplifier system 10' of FIG. 5 is operative to adaptively set the biasing resistance $R_t$ for a given MR head. As a result, current noise can be reduced for an appropriate range of bias current. The test portion 100 of the control system 98 further may be controlled to test the MR head resistance $R_{MR}$ intermittently so that the control system can adjust the biasing resistance in response to any changes in MR head resistance $R_{MR}$. It further will be understood that the variable resistors $R_{v1}$ and $R_{v2}$ can be implemented as respective parallel resistor strings having switches for connecting resistors into the resistors paths. Alternatively, $R_{v1}$ and $R_{v2}$ can be implemented as any devices capable of providing a variable resistance path, which resistances can be tailored according to the desired bias current.

Figure 6:
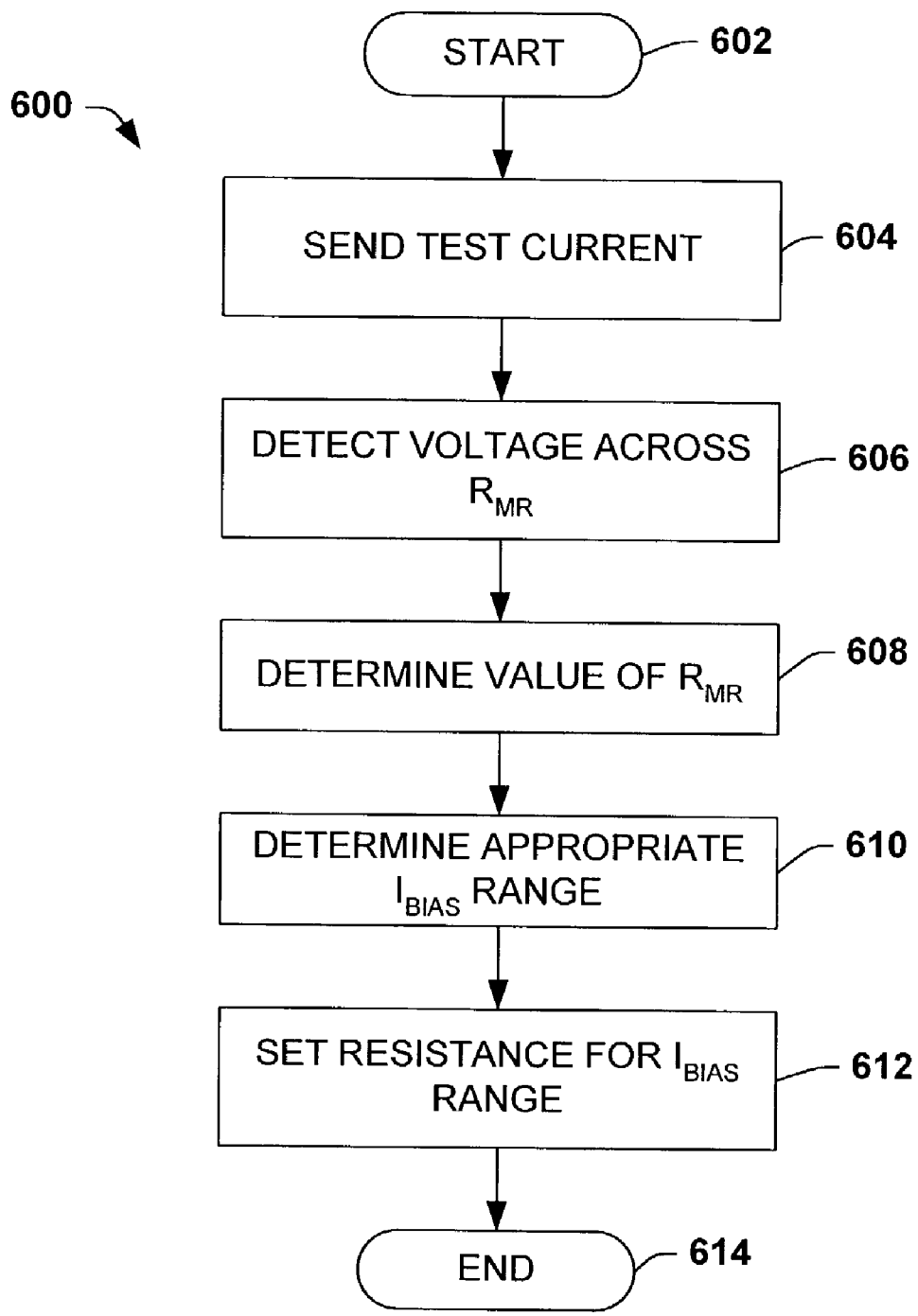
FIG. 6 is a flow diagram illustrating the process of controlling the preamplifier system of FIG. 5 in accordance with an aspect of the present invention.

FIG. 6 is a flow diagram illustrating the process 600 of controlling a preamplifier system in accordance with an aspect of the present invention. For purposes of ease of explanation the flow diagram will be described with respect to the system 10' shown and described with respect to FIG. 5. The illustrated order in the process 600 is intended for purposes of example, as some aspects may, in accordance with the present invention, occur in different orders and/or concurrently with other functions from that shown and described herein. Moreover, not all illustrated features may be required to implement a methodology in accordance with the present invention.

The process 600 begins at 602, such as at power up. At power up, for example, system initializations can occur, such as allocating memory, acquiring resources, and setting initial conditions for variables and flags. At 604, an appropriate test current is applied through an MR head, such as by the test portion 100. At 606, the voltage across the MR head is detected based on the applied test current.

At 608, the MR head resistance $R_{MR}$ is calculated, such as based on the test current and the measured voltage across the MR head. Then at 610, an appropriate range of bias current for the MR head is determined. This determination can be based on a look-up table or by computation according to a predefined algorithm.

At 612, a resistance path is established to provide a corresponding maximum resistance for the subrange determined at 610. For example, the control system 98 in an IC that includes the preamplifier can calculate a total resistance Rt. To calculate the total resistance $R_t$ provided by variable resistors $R_{v1}$ and $R_{v2}$, for example, the control system 98 employs the following formula:

$$R_t = (R_{v1} + R_{v2}) = (V_{Control\_max}/I_{bias\_max}) - R_{MR} \qquad \text{Eq. 3}$$

The determination at 612 can also include setting a resistance for each the variable resistors $R_{v1}$ and $R_{v2}$, such as based on using predetermined resistor values given the current subrange. This information also can be included in the look-up table, such as is indexed according to determined bias current range and/or $R_{MR}$ resistance. After the resistance for the preamplifier has been set, the process 600 ends at 614. Those skilled in the art will understand and appreciate that the methodology of FIG. 6 provides an adaptive approach that can be utilized to program a preamplifier to mitigate current noise from that of conventional systems.

What has been described above includes examples and implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A preamplifier system for biasing an associated device, the preamplifier system comprising:
a first preamplifier component connectable to the associated device; and
a second preamplifier component connectable to the associated device such that, upon application of power to the first and second preamplifier components when connected to the associated device, a bias exists between the first and second preamplifier components and across the associated device;
at least one of the first and second preamplifier components including a programmable impedance, the programmable impedance being set based on at least one parameter of the associated device.

2. The preamplifier system of claim 1, the associated device comprising a magneto-resistive device, the parameter comprising a desired bias current associated with the magneto-resistive device.

3. The preamplifier system of claim 1, the associated device comprising a magneto-resistive device, the parameter comprising a resistance of the magneto-resistive device.

4. The preamplifier system of claim 1, the first preamplifier component including a plurality of parallel branches, each respective branch of the plurality of parallel branches including a switch associated with a resistor, each switch having a condition that defines whether the respective branch is connected to bias the associated device.

5. The preamplifier system of claim 4, further comprising a control system that selectively controls the condition of each of the switches to set the programmable impedance of the first preamplifier component.

6. The preamplifier system of claim 4, each respective branch of the plurality of parallel branches also including a resistor, at least some of the resistors having different resistance values, a resistance of the first preamplifier component varying based on the condition of the switches of the first preamplifier component.

7. The preamplifier system of claim 6, each respective branch of the plurality of branches including an associated transistor having an emitter connected to the resistor of the respective branch, the switch of each respective branch being connected to control its associated transistor so as to determine if the resistor of the respective branch is electrically connected to bias the associated device.

8. The preamplifier system of claim 1, the first preamplifier component comprising first and second branches, the first branch including a first switch, a first resistor, and a first transistor, the second branch including a second switch, a second resistor and a transistor, the first preamplifier component providing a first resistance when only the first switch is closed, the first preamplifier component providing a second, different resistance when only the second switch is closed, and the first preamplifier component providing a third, different resistance when both the first and second switch are closed.

9. The preamplifier system of claim 8, the second preamplifier component including third and fourth branches, the third branch including a third switch, a third resistor, and a third transistor, the fourth branch including a fourth switch, a fourth resistor and a fourth transistor, the second preamplifier component providing a fourth resistance when only the switch is closed, the second preamplifier component providing a fifth, different resistance when only the fourth switch is closed, and the second preamplifier component providing a sixth, different resistance when both the third and fourth switches are closed.

10. The preamplifier system of claim 1, the second preamplifier component comprising a plurality of parallel branches, each respective branch of the plurality of parallel branches including a switch having a condition that defines whether the respective branch is connected to affect biasing the associated device.

11. The preamplifier system of claim 10, each respective branch of the plurality of parallel branches of the second preamplifier component also including a resistor, at least some of the resistors having different resistance values, a resistance of the second preamplifier component varying based on the condition of the switches of the second preamplifier component.

12. The preamplifier system of claim 11, each respective branch of the plurality of branches of the second preamplifier component further comprising an associated transistor having an emitter connected to the resistor of the respective branch, the switch of each respective branch being connected to control its associated transistor so as to set whether the resistor of the respective branch is electrically connected to bias the associated device.

13. An integrated circuit comprising:
a preamplifier circuit for biasing an associated device, the preamplifier circuit including a first preamplifier component and a second preamplifier component;
first and second input terminals adapted to connect the preamplifier circuit to a power supply; and
first and second device terminals adapted to connect the preamplifier circuit to the associated device,
the first preamplifier component of the preamplifier circuit being operatively connected between the first input terminal and the first device terminal,
the second preamplifier component of the preamplifier circuit being operatively connected between the second input terminal and the second device terminal,
at least one of the first and second preamplifier components including a programmable resistance, the programmable resistance being set based on a parameter of the associated device to provide a desired bias to the associated device and mitigate noise when the associated device is connected at the first and second device terminals and power is applied at the first and second input terminals.

14. The integrated circuit of claim 13, the associated device being a magneto-resistive device, the parameter comprising at least one of a bias current for the magneto-resistive device and a resistance of the magneto-resistive device.

15. The integrated circuit of claim 13, the first preamplifier component including a plurality of branches connected in parallel to the first device terminal, each respective branch of the plurality of parallel branches including a switch having a condition, the programmable resistance associated with the first preamplifier component varying based on the conditions of the respective switches.

16. The integrated circuit of claim 15, each respective branch of the plurality of branches further comprising a resistor, at least some of the resistors having different resistance values, the programmable resistance of the first preamplifier component varying based on the resistance values of the resistors and the condition of the respective switches.

17. The integrated circuit of claim 16, each respective branch of the plurality of branches further comprising an associated transistor having an emitter connected to the resistor of the respective branch, the switch of each respective branch being connected to control its associated transistor so as to set whether the resistor of the respective branch is electrically connected to affect biasing of the associated device.

18. The integrated circuit of claim 13, the first preamplifier component including first and second branches, the first branch including a first switch, a first transistor, and a first resistor connected to an emitter of the first transistor, the second branch including a second switch, a second transistor, and a second resistor connected to an emitter of the second transistor, the first preamplifier component providing a first resistance when only the first switch is closed, the first preamplifier component providing a second, different resistance when only the second switch is closed, and the first preamplifier component providing a third, different resistance when both the first and second switches are closed.

19. The integrated circuit of claim 18, the second preamplifier component including third and fourth branches, the third branch including a third switch, a third transistor, and a third resistor connected to an emitter of the third transistor, the fourth branch including a fourth switch, a fourth transistor, and a fourth resistor connected to an emitter of the fourth transistor, the second preamplifier component providing a fourth resistance when only the switch is closed, the second preamplifier component providing a fifth, different resistance when only the fourth switch is closed, and the second preamplifier component providing a sixth, different resistance when both the third and fourth switches are closed.

20. The integrated circuit of claim 19, each respective branch of the plurality of parallel branches also including a resistor, at least some of the resistors having different resistance values, a resistance of the second preamplifier component varying based on the condition of the switches of the second preamplifier component.

21. The integrated circuit of claim 20, each respective branch of the plurality of branches including an associated transistor having an emitter connected to the resistor of the respective branch, the switch of each respective branch being connected to control its associated transistor so as to set whether the resistor of the respective branch is electrically connected to affect biasing the associated device.

22. The integrated circuit of claim 13, the second preamplifier component including a plurality of branches connected in parallel to the second device terminal, each respective branch of the plurality of parallel branches including a switch having a condition, the programmable resistance associated with the second preamplifier component varying based on the conditions of the respective switches of the second preamplifier component.

23. A method for configuring a preamplifier system to facilitate biasing an associated device, the method comprising:
defining a desired current for operation of the associated device; and
setting a biasing resistance for a resistance path of the preamplifier system based on the desired current so as to mitigate current noise when current is provided to the associated device within a corresponding current subrange.

24. The method of claim 23, further comprising:
determining the corresponding current subrange based on the desired current, and
setting the biasing resistance based on the determined current subrange.

25. The method of claim 23, further comprising:
determining a resistance of the associated device; and
determining the corresponding current range based on the determined resistance of the associated device.

26. The method of claim 25, the determining a resistance of the associated device further comprising:
applying a predetermined test current across the associated device;
measuring voltage across the associated device based on the applied test current; and calculating the resistance of the associated device based on the test current and the measured voltage.

27. The method of claim 23, the preamplifier system comprising first and second preamplifier components that are connectable to the associated device, at least one of the first and second preamplifier components including a programmable resistance that defines at least a portion of the biasing resistance, the method further comprising programming the programmable resistance in response to a parameter of the associated device to enable a desired bias between the first and second preamplifier components when the associated device is connected between the first and second preamplifier components and the first and second preamplifier components receive power from the power source.

28. The method of claim 27, the programming the biasing resistance further comprising selectively energizing one or more branches of a plurality of parallel branches of the at least one of the first and second preamplifier components, each branch of the plurality of parallel branches having an associated resistance.

29. The method of claim 28, each respective branch of the plurality of parallel branches including an actuatable switch, the method further comprising controlling actuation of each of actuatable switches in the first preamplifier component.

30. The method of claim 27, the programming a programmable resistance of at least one of the first and second preamplifier components further comprising selectively energizing one or more branches of a plurality of parallel branches of each of the first and second preamplifier components, each branch of the plurality of parallel branches having an associated resistance.

* * * * *